Sept. 18, 1951     C. J. BIANCA, SR     2,568,481
ACCELERATOR CONTROLLING DEVICE
Filed Aug. 25, 1949                             2 Sheets-Sheet 1
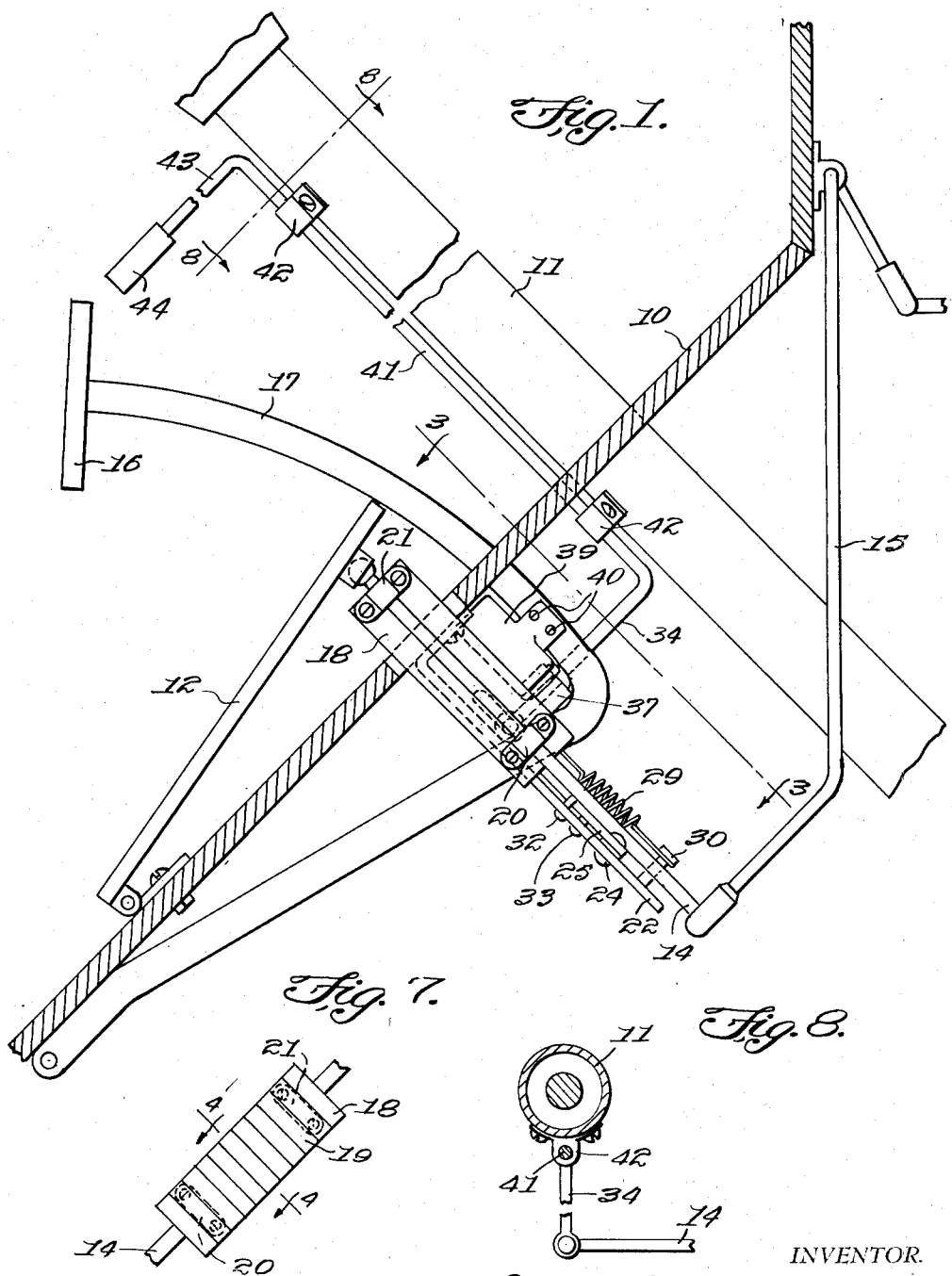
INVENTOR.
Carmelo J. Bianca, Sr,
BY Victor J. Evans & Co.
ATTORNEYS

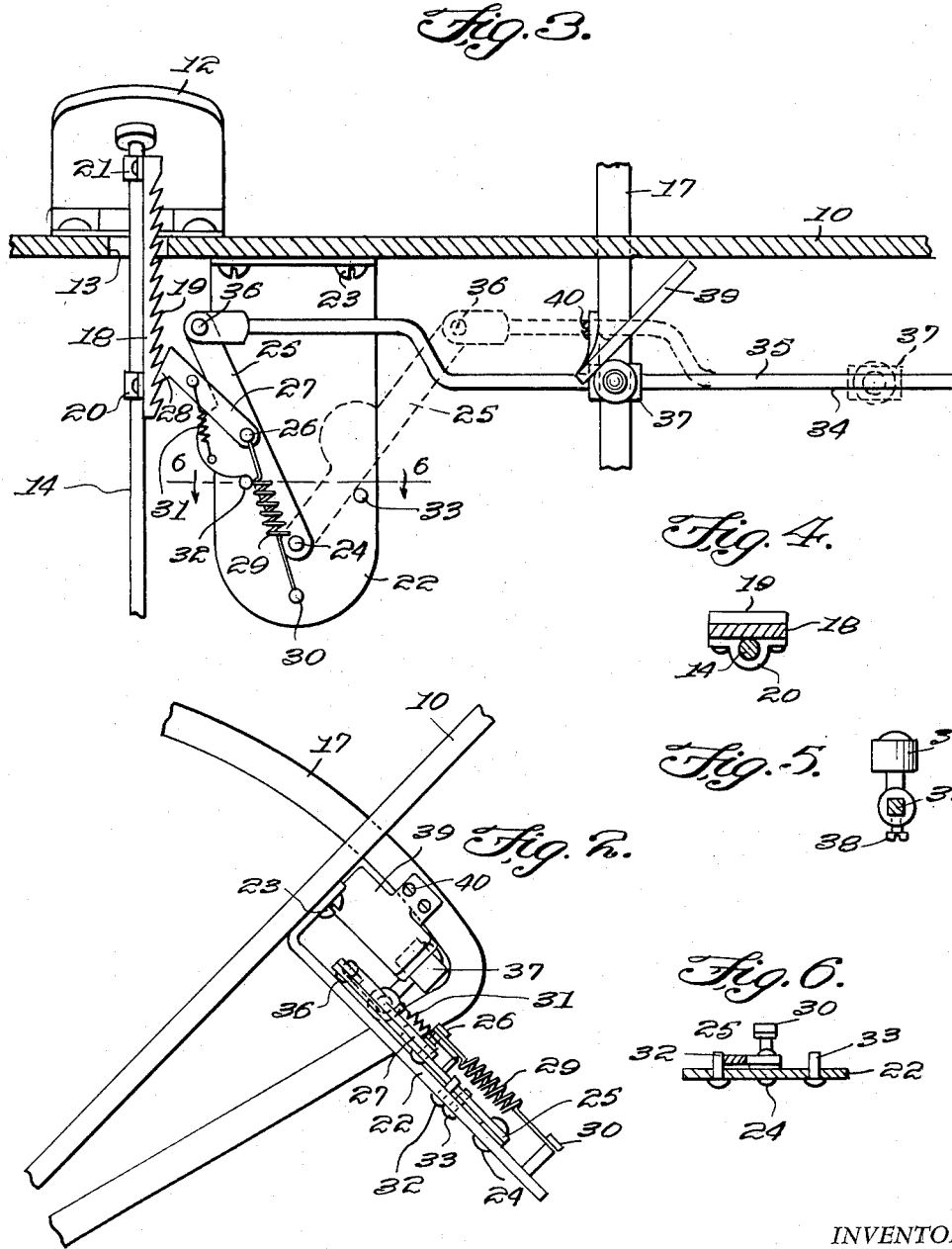

Patented Sept. 18, 1951

2,568,481

UNITED STATES PATENT OFFICE 2,568,481

ACCELERATOR CONTROLLING DEVICE

Carmelo Joseph Bianca, Sr., Indianola, Miss.

Application August 25, 1949, Serial No. 112,387

1 Claim. (Cl. 192—3)

This invention relates to an automotive vehicle, and more particularly to a device for controlling the accelerator of the vehicle.

The object of the invention is to provide a device for releasably holding the accelerator of a vehicle in any position to which it has been adjusted so that the driver will not become fatigued by having to maintain his foot upon the accelerator pedal.

Another object of the invention is to provide an accelerator control device whereby the accelerator pedal can be held in any desired position to maintain the desired vehicle speed, the device being actuated to release the accelerator pedal upon the slightest depression of the vehicle foot brake.

A further object of the invention is to provide an accelerator controlling device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary sectional view, showing the accelerator controlling device of the present invention;

Figure 2 is a fragmentary sectional view showing certain constructional details of the device;

Figure 3 is a sectional view taken on the line 3—3 of Figure 1;

Figure 4 is a sectional view taken on the line 4—4 of Figure 7;

Figure 5 is a fragmentary sectional view showing the roller mounted on the push rod;

Figure 6 is a sectional view taken on the line 6—6 of Figure 3;

Figure 7 is a side elevational view of the tooth rack bar;

Figure 8 is a sectional view taken on the line 8—8 of Figure 1.

Referring in detail to the drawings, the numeral 10 designates a portion of the vehicle floorboard and projecting thru the floorboard 10 is the usual steering column 11, Figures 1 and 8. The vehicle further includes an accelerator pedal 12 which has a lever 14 connected thereto, the lever 14 extending through a slot 13 in the floorboard 10. The accelerator 12 is adapted to actuate the usual mechanism 15 that leads to the vehicle carburetor for controlling the speed of the vehicle, Figure 1. The vehicle further includes a brake pedal 16 that has an arm 17 connected thereto, and the arm 17 projects through the floorboard 10 in the usual manner.

The present invention is directed to a device for controlling or holding the accelerator pedal 12 immobile in any adjusted position whereby the driver of the vehicle will not become fatigued by having to hold his foot on the accelerator pedal 12 in order to maintain the desired speed of the vehicle. The device of the present invention maintains the accelerator pedal 12 immobile in any of its adjusted positions and as soon as the operator presses the brake pedal 16, a means is provided for releasing the control device whereupon the accelerator pedal 12 is again ready for normal use.

The control device of the present invention includes a rack bar 18 which is provided with a plurality of teeth 19 thereon, and the rack bar 18 is secured to the lever 14 by a pair of clamp brackets 20 and 21, Figure 3.

Arranged below the vehicle floorboard 10 and secured thereto by suitable securing elements, such as screws 23, is a plate 22. A pin 24 pivotally connects an arm 25 to the plate 22 and a link 27 is pivotally connected to the arm 25 by means of a pin 26. The link 27 is provided with a tooth 28 that is mounted for movement into and out of engagement with one of the teeth 19 on the rack bar 18. A coil spring 29 extends between the pin 26 and a pin or rivet 30 on the plate 22 for a purpose to be later described. For normally maintaining the tooth 28 of the link 27 in engagement with the teeth on the rack bar 18, a coil spring 31 extends between the arm 25 and the link 27.

Limiting swinging or pivotal movement of the arm 25 is had when a pair of pins 32 and 33 are secured to the plate 22, and the pins 32 and 33 are adapted to be contacted by the arm 25 to limit pivotal movement of the latter.

A means is provided for moving the tooth 28 of the link 27 into locking engagement with the rack bar 18 and this means includes a push rod 34 which has an intermediate portion 35 of square cross section, Figure 5. A pivot pin 36 pivotally connects one end of the push rod 34 to the free end of the arm 25 for a purpose to be later described. Mounted on the square portion 35 of the push rod 34 is a roller assembly 37, there being a set screw 38 for maintaining the roller assembly 37 immobile on the push rod 34. A plate 39 is secured to the brake pedal lever 17 by suitable securing elements, such as screws 40, and the plate 39 is mounted for movement into engagement with the roller assembly 37 whereby the link 27 will move out of engagement with the rack bar 18 when the brake pedal 16 is depressed, so that normal use of the accelerator pedal can be accomplished.

The push rod 34 is provided with a straight portion 41 which is arranged at right angles with respect to the portion 35 thereof. A pair of bearing brackets 42 rotatably connect the straight portion 41 to the vehicle stearing column 11, Figure 1. The push rod further includes a transverse portion 43 which has a handle 44 affixed thereto and the handle 44 is adapted to be readily gripped in the user's hand when the accelerator pedal is to be controlled.

In use, as long as the vehicle is being driven in normal manner, the accelerator control device of the present invention is arranged and constructed so that there will be no interference with normal driving. In the event that the operator wishes to hold the accelerator pedal 12 in its adjusted position, as when the vehicle is being used on a long trip, the control device of the present invention is actuated. Thus, the operator grasps the handle 44 and moves the push rod 34 to the position shown by dotted lines in Figure 3. This movement of the push rod 34 causes the arm 25 to pivot which in turn moves the tooth 28 of the link 27 into engagement with one of the teeth 19 on the rack bar 18. The spring 31 will maintain the tooth 28 in engagement with the tooth 19 so that the accelerator pedal 12 will remain immobile in its adjusted or depressed position. To disengage the control device, the user need only move the handle 44 and push rod 34 in the opposite direction whereupon the push rod 34 and arm 25 will move to the position shown by dotted lines in Figure 3 whereupon the tooth 28 will move out of engagement with the teeth 19 so that the accelerator pedal 12 can be used in the normal manner. Further, a means is provided for disengaging the control device from the accelerator as soon as the operator depresses the brake pedal 16. Thus, when the operator depresses the brake pedal 16, the plate 39 contacts the roller assembly 37 on the push rod 34 to thereby move the push rod 34 slightly and the spring 29 immediately causes the arm 25 to pivot to the dotted line position shown in Figure 3, and this of course frees the accelerator pedal whereupon the accelerator pedal can be used in the normal manner.

What I claim:

In a vehicle, the combination with a vehicle floor board, an accelerator pedal, an accelerator lever connected to said accelerator pedal and extending through said floor board, a steering column, a brake pedal, a lever connected to said brake pedal and extending through said floor board, of a device for releasably holding said accelerator pedal immobile in its adjusted position, said device comprising a rack bar connected to the accelerator lever, a plate arranged below said floor board and secured thereto, an arm pivotally connected to said plate, a pair of pins arranged on the plate on opposite sides of the arm to limit the movement of said arm in relation to said plate, a link pivotally connected to said arm and mounted for movement into and out of engagement with said rack bar, a push rod rotatably connected to said steering column for moving said link to engagement with said rack bar, means embodying a plate connected to the brake pedal lever for moving said link out of engagement with said rack bar upon depression of said brake pedal to permit normal use of the accelerator, resilient means for normally urging said link into engagement with said rack bar, said last-named means comprising a coil spring having one end connected to said link and its other end connected to said arm and a second resilient means comprising a second coil spring having one end connected to said link and its other end to said plate, to retain the link in engagement with said rack bar to retain said accelerator pedal immovable.

CARMELO JOSEPH BIANCA, Sr.

REFERENCES CITED

The following references are of record in the file of this patent:

UNITED STATES PATENTS

| Number | Name | Date |
|---|---|---|
| 1,569,612 | Burrows | Jan. 12, 1926 |
| 1,662,211 | Shier | Mar. 13, 1928 |
| 2,204,265 | Wentzel | June 11, 1940 |
| 2,235,175 | Simpkins | Mar. 18, 1941 |
| 2,364,092 | O'Connor | Dec. 5, 1944 |
| 2,490,473 | Rodkey | Dec. 6, 1949 |